US010805653B2

(12) United States Patent
Reif

(10) Patent No.: US 10,805,653 B2
(45) Date of Patent: Oct. 13, 2020

(54) ACCOUNTING FOR LOCATIONS OF A GAZE OF A USER WITHIN CONTENT TO SELECT CONTENT FOR PRESENTATION TO THE USER

(71) Applicant: Facebook, Inc., Menlo Park, CA (US)

(72) Inventor: Daniel Jacob Reif, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/854,580

(22) Filed: Dec. 26, 2017

(65) Prior Publication Data
US 2019/0200059 A1 Jun. 27, 2019

(51) Int. Cl.
*H04N 21/25* (2011.01)
*H04N 21/2343* (2011.01)
*H04N 21/845* (2011.01)
*H04N 21/258* (2011.01)
*H04N 21/81* (2011.01)
*H04N 21/441* (2011.01)
*H04N 21/466* (2011.01)
*H04N 21/442* (2011.01)
*H04N 21/2668* (2011.01)
*G06F 16/74* (2019.01)

(52) U.S. Cl.
CPC ......... *H04N 21/252* (2013.01); *G06F 16/743* (2019.01); *H04N 21/234363* (2013.01); *H04N 21/25883* (2013.01); *H04N 21/25891* (2013.01); *H04N 21/2668* (2013.01); *H04N 21/441* (2013.01); *H04N 21/44218* (2013.01); *H04N 21/4667* (2013.01); *H04N 21/8133* (2013.01); *H04N 21/8456* (2013.01)

(58) Field of Classification Search
CPC ..... H04N 21/234363; H04N 21/25883; H04N 21/25891; H04N 21/2668; H04N 21/441; H04N 21/44218; H04N 21/4667; H04N 21/8133; H04N 21/8456
USPC .......................................................... 725/12
See application file for complete search history.

(56) References Cited

U.S. PATENT DOCUMENTS

| | | | | |
|---|---|---|---|---|
| 2007/0273926 | A1* | 11/2007 | Sugiyama | H04N 7/163 358/1.18 |
| 2014/0007148 | A1* | 1/2014 | Ratliff | H04N 21/4667 725/12 |
| 2016/0260196 | A1* | 9/2016 | Roimela | G06F 3/013 |
| 2016/0360267 | A1* | 12/2016 | Marilly | G06F 3/013 |
| 2016/0366365 | A1* | 12/2016 | Iyer | H04N 7/0117 |

(Continued)

*Primary Examiner* — NNenna N Ekpo
(74) *Attorney, Agent, or Firm* — Fenwick & West LLP

(57) ABSTRACT

An online system provides video data to client devices for presentation to users. Various client devices include a gaze tracking system that identifies locations within the video data where users' gazes were directed at different times during presentation of the video data and provides the identified locations to the online system. Based on characteristics of the users and of the video data, the online system generates a model determining likelihoods of a user's gaze being directed to different locations within the video data at different times. When the online system selects the video data for presentation to a target user, the online system applies the model to the target user and the video data. Based on the resulting likelihoods, the online system modifies resolutions of different locations of the video data when providing the video data to a client device for presentation to the target user.

20 Claims, 3 Drawing Sheets

(56) References Cited

U.S. PATENT DOCUMENTS

| | | | |
|---|---|---|---|
| 2017/0039719 A1* | 2/2017 | Merkel | G06F 3/013 |
| 2017/0084083 A1* | 3/2017 | Wilson | G09G 5/026 |
| 2017/0289596 A1* | 10/2017 | Krasadakis | H04N 21/25883 |
| 2017/0295373 A1* | 10/2017 | Zhang | H04N 19/136 |
| 2017/0302918 A1* | 10/2017 | Mammou | H04N 19/103 |
| 2018/0004285 A1* | 1/2018 | Castleman | H04L 65/4069 |
| 2018/0004289 A1* | 1/2018 | Wilson | G06K 9/2027 |
| 2018/0077345 A1* | 3/2018 | Yee | G06K 9/00604 |
| 2018/0077455 A1* | 3/2018 | Abou Mahmoud | H04N 21/4223 |
| 2018/0096461 A1* | 4/2018 | Okayama | G06T 7/10 |
| 2018/0146198 A1* | 5/2018 | Atluru | G06K 9/00711 |
| 2018/0190091 A1* | 7/2018 | Yuan | G08B 13/19682 |
| 2019/0058918 A1* | 2/2019 | Itzkowitz | G06F 3/011 |

* cited by examiner

ACCOUNTING FOR LOCATIONS OF A GAZE OF A USER WITHIN CONTENT TO SELECT CONTENT FOR PRESENTATION TO THE USER

BACKGROUND

This disclosure relates generally to presenting content to online system users, and more specifically to accounting for likelihoods of the online system user's gaze being directed to different locations of video data when presenting the video data.

Increasingly, online systems provide client devices with content for presentation that includes an increasing amount of detail. For example, an online system provides content to users representing a virtual environment allowing the user to interact with various objects within the virtual environment. While the increased amount of detail include in provided content allows users to more fully immerse themselves in the presented content, the increased amount of detail consumes an increasing amount of resources to be transmitted from an online system to a client device for presentation.

The increased resources for transmitting certain content from an online system to a client device may impair presentation of content to certain users. For example, presenting content to users accessing the online system via client devices having limited computing resources or via a lower-quality connection to a network may increase a time to present the content via a client device or result in the client device presenting content having degraded quality. As an example, limited network connectivity causes a client device to present video data from the online system with low resolution, discouraging the user from requesting additional video data from the online system. However, users typically focus on particular locations within content presented by a client device (e.g., a specific location within video data), so reductions in quality of locations within the content where the user is not focused are less likely to negatively affect user perception of the content.

SUMMARY

The online system receives or maintains various video content received from users and presents various video data from the video content to online system users. For example, the online system selects video data for presentation to a user based on characteristics of different video content and characteristics of the user through one or more selection processes. As the online system receives requests for content from various users, the online system provides video data to client devices associated with the various users for presentation. Each client device includes a display device configured to present content, including the video data, to a user of the client device.

Various client devices also include a gaze tracking system that captures information identifying locations of the display device where a user's gaze was directed at different times. For example, the display device of a client device is a head mounted display (HMD) including an electronic display element presenting content to a user and also including a gaze tracking system configured to capture information about the user's eyes from which a location of the display device where a gaze of the user is directed at different times during presentation of the video data. In some embodiments, based on the location where the gaze of the user is directed at different times during presentation of the video data, the client device identifies the video data, a location within the video data corresponding to the location of the display device where the gaze of the user was directed, and associates the location within the video data where the gaze of the user was directed with a portion of the video data presented when the gaze of the user was determined. For example, the client device associates the location within the video data where the gaze of the user was directed with a timestamp of the video data presented by the client device. This allows the client device to capture information about locations within the video data where the gaze of the user was directed at different times within video data provided by the online system and presented by the client device.

The online system subsequently receives information describing viewing of the provided video data from client devices including gaze tracking systems by viewing users who were presented with the video data. In various embodiments, the online system receives information identifying video data presented to a viewing user by a client device and locations within the video data where the gaze of the viewing user was directed that are each associated with a timestamp identifying a portion of the video presented by the display device of the client device. Alternatively, the online system receives information identifying video data presented to a viewing user by a client device, locations of the display device of the client device where the gaze of the viewing user was directed that are each associated with a timestamp identifying a portion of the video presented by the display device of the client device, and information describing the display device of the client device. From the locations of the display device where the gaze of the viewing user was directed at different timestamps, the video data, and the information describing the display device, the online system determines locations of the video data where the gaze of the viewing user was directed at different timestamps. A location of the video data where the gaze of the viewing user was directed identifies one or more pixels of the video data where the gaze of the viewing user was directed. For example, the online system identifies a location of the video data corresponding to a location of the display device where the gaze of the viewing user was directed at a timestamp to determine a location within the video data presented at the timestamp where the gaze of the user was directed.

For viewing users for whom information describing viewing of the video data was received from various client devices, the online system retrieves characteristics of the viewing users maintained by the online system. The online system retrieves any suitable characteristics of a viewing user from information associated with the viewing user by the online system. For example, the online system retrieves demographic information and interests of a viewing user from a user profile maintained by the online system for the viewing user, connections between the viewing user and other users or objects of the online system, actions performed by the viewing user, or any other characteristics of the viewing user maintained by the online system.

Based on characteristics of various viewing users, characteristics of video data presented to the viewing users, and identified locations within the video data where gazes of viewing users to whom video data was presented were directed during different portions of the video data, the online system generates a model identifying likelihoods of a gaze of a user being directed to locations within the video data during various portions of the video data. In various embodiments, the online system generates a model for specific video data, such as a specific video file, presented to various viewing users based on characteristics of the viewing users, characteristics of the specific video data, and identified locations within the specific video data where gazes of viewing users to whom the specific video data was presented were directed during different portions of the specific video data. In some embodiments, the online system accounts for presentation of other video data presented to viewing users and having at least a threshold amount of characteristics matching characteristics of the specific video data. For example, the online system retrieves other video data having at least the threshold amount of characteristics matching characteristics of the specific video data, retrieves locations within the specific video data where gazes of viewing users to whom the other identified video data was presented were directed during different portions of the identified other video data and generates the model based on characteristics of viewing users presented with the video data or with the identified other video data, characteristics of video data presented to the viewing users, characteristics of the identified other video data, identified locations within the video data where gazes of viewing users to whom the video data was presented were directed during different portions of the video data, and identified locations within the video data where gazes of viewing users to whom the other video data was presented were directed during different portions of the video data. In some embodiments, if the online system determines specific video data was presented to less than a threshold number or less than a threshold amount of viewing users, the online system generates a model for the specific video data based on characteristics of viewing users presented with the identified other video data, characteristics of the identified other video data, and identified locations within the video data where gazes of viewing users to whom the identified other video data was presented were directed during different portions of the identified other video data.

Alternatively or additionally, the online system generates a model based on characteristics of different video data presented to the viewing users, characteristics of the viewing users, and identified locations within different video data where gazes of viewing users to whom video data was presented were directed during different portions of the video data; hence, the online system may generate a model applicable to various video data to determine likelihoods of gazes of online system users being directed to different locations within video data during presentation of different portions of the video data to the users. In other embodiments, the online system generates a model for different groups of users, with each user in a group having one or more common characteristics. For example, the online system identifies a group of viewing users having one or more common characteristics, and generates a model for the group of viewing users based on characteristics of viewing users of the group presented with video data, characteristics of the video data, and identified locations within the video data where gazes of viewing users of the group were directed during different portions of the video data. As further described above, the online system may account for presentation of different video data to viewing users of the group and locations within different video data where gazes of viewing users of the group were directed during different portions of the different video data when generating the model for the group. Alternatively, the online system generates the model for the group based on presentation of specific video data to users of the group and locations within the specific video data where gazes of users of the group were directed during different portions of the specific video data. The online system stores the model generated for the group of viewing users in association with information identifying the one or more common characteristics of viewing users of the group. Models generated for different groups are stored by the online system. In various embodiments, the online system the online system uses one or more machine learning methods to generate the model or models.

Subsequent to generating the model, the online system identifies a target user to be presented with the video data. For example, the online system receives a request for content from a client device associated with the target user and selects the video data for presentation to the target user. The online system retrieves one or more models and applies a retried model to characteristics of the target user and characteristics of the viewing user. Application of the model determines likelihoods of the gaze of the target user being directed to different segments of the video data. Based on the determined likelihoods, the online system determines the target segment of the video data, as further described above. As the video data is presented to the target user via the client device associated with the target user, the gaze tracking system of the client device associated with the target user identifies locations within the video data where the gaze of the target user is directed during different portions of the video data to the online system. The online system applies the retrieved model to the characteristics of the user, to the characteristics of the video data, and to the identified location within the video data where the gaze of the target user was directed during a portion of the video data to determine a target segment of a subsequent portion of the video data.

In some embodiments, the online system transmits one or more portions of the video data including one or more segments of the video data and correspond to a time interval of the video data to a client device associated with a target user for presentation. For example, the online system transmits one or more portions of the video data to a client device for presentation to a target user to whom the video data has not previously been presented. Segments of the video data included in the transmitted one or more portions each correspond to one or more locations within the video data. As the client device presents the portion of the video data to the target user via a display device, a gaze tracking system of the client device captures information about the target user's eyes from which a location of the display device where a gaze of the target user is directed at different times during presentation of the portion of the video data, as further described above. The client device associated with the target user transmits information where the gaze of the target user is directed at different times during presentation of the portion of the video data to the online system, as further described above.

When the online system receives the information from the client device associated with the target user identifying one or more locations within the video data where the gaze of the target user was directed, the online system retrieves one or more models and determines a target segment of the video data based on the retrieved model. The target segment comprises one or more pixels corresponding to locations within the video data. For example, the online system applies a model to characteristics of the target user and characteristics of the video data to determine likelihoods of the gaze of the target user being directed to different locations at times subsequent to a time when the information identifying the one or more locations within the video data where the gaze of the target user was directed during presentation of the one or more portions of the video data. In various embodiments, application of a model to characteristics of the target user and to characteristics of the video data generates a map of the video data associating likelihoods of the gaze of the target user being directed to different segments of the video data, which each correspond to locations within the video data. In various embodiments, the retrieved model accounts for one or more locations within the video data where the gaze of the target user was directed during different portions of the video data when determining likelihoods of the gaze of the target user being directed to different locations within the video data. The online system determines the target segment of the video data based on the likelihoods of the gaze of the target user being directed to different segments of the video data generated from application of the model. In various embodiments, the online system determines the target segment as a segment of the video data as a segment of the video data for which the model generated a maximum likelihood of the gaze of the user being directed.

Alternatively, when the online system selects the video data for presentation to the target user, the online system retrieves one or more models and applies a retrieved model to characteristics of the target user and characteristics of the viewing user. Application of the model determines likelihoods of the gaze of the target user being directed to different segments of the video data. Based on the determined likelihoods, the online system selects a target segment of the video data, as further described above. As the video data is presented to the target user via the client device associated with the target user, the gaze tracking system of the client device associated with the target user identifies locations within the video data where the gaze of the target user is directed during different portions of the video data to the online system. The online system applies the retrieved model to the characteristics of the user, to the characteristics of the video data, and to the identified location within the video data where the gaze of the target user was directed during a portion of the video data to select a target segment of a subsequent portion of the video data.

The online system transmits the target segment of the video data to the client device associated with the target user for presentation at a higher quality than other segments of the video data. For example, the online system transmits additional segments of the video data to the client device associated with the target user at a lower resolution than a resolution of the target segment of the video data. In some embodiments, the online system transmits segments of the video data to the client device associated with the target user at resolutions that are directly related to likelihoods of the gaze of the target user being directed to the segments, with the target segment transmitted to the client device associated with the target user at a higher resolution than other segments of the video data. For example, the online system transmits segments of the video data to the client device associated with the target user with resolutions that are directly proportional to likelihoods of the gaze of the target user being directed to different segments of the video data determined by the model. In other embodiments, the online system transmits 335 the target segment to the client device associated with the target user at a higher frame rate than frame rates with which other segments of the video data are transmitted to the client device associated with the target user.

In some embodiments, the online system selects content for presentation to the target user based on characteristics of the target user and modifies the target segment of the video data to include the selected content. The modified target segment is transmitted to the client device associated with the target user, so presentation of the modified video data by the client device associated with the target user presents the selected content to the target user via the target segment of the video data. For example, the online system selects a content item for presentation to the target user via one or more selection processes and modifies the target segment of the video data by overlaying a portion of the selected content item (e.g., an image, text data) on the target segment of the video data on the target segment. This allows the online system to present the selected content in a location within the video data where the target user's gaze is most likely to be directed, increasing a likelihood of the target user viewing the selected content when viewing the video data.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
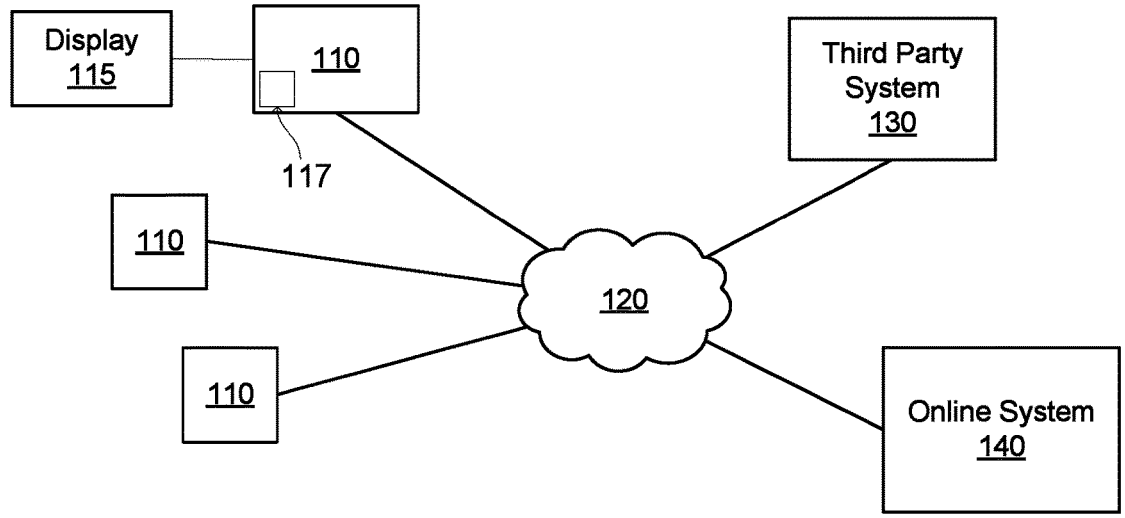
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. Additionally, in the system environment 100 shown by FIG. 1, a controller 117 is coupled to a client device 110. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

Various client devices 110 include display devices 115, which may be integrated into a client device 110 or coupled to a client device 110. For example, a display device 115 integrated into a client device 110 is a display screen included in the client device 110. Alternatively, the display device 115 is a monitor or other display coupled to the client device 110. In other embodiments, the display device 115 is included in a headset or head mounted device (HMD) coupled to the client device 110 and configured to be worn on a user's head. Such a headset or HMD may include additional components that position the display device 115 relative to a user's eyes so content presented by the display device 115 presents a virtual environment to the user. Alternatively, the display device 115 is integrated into the client device 110, and the client device 110 is positioned within a headset or HMD so the display device 115 integrated into the client device 110 is positioned relative to the user's eyes so content presented by the display device 115 presents a virtual environment to the user. Content presented by the display device 115 is determined by an application executing on the client device 110. Different applications may be included on the client device 110, so execution of different applications changes the content presented by the user by the display device 115.

Additionally, one or more client devices 110 include a gaze tracking system 117 configured to capture information identifying locations of the display device 115 where a user's gaze was directed at different times. In various embodiments, a gaze tracking system 117 comprises an image capture device 110 configured to capture images of portion of a user's face including the user's eyes. The gaze tracking system 117 includes instructions that, when executed by a processor, analyze the segments of the captured images including the user's eyes and identify a location where the user's gaze was directed based on characteristics of the user's eyes in the segments of the captured images.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
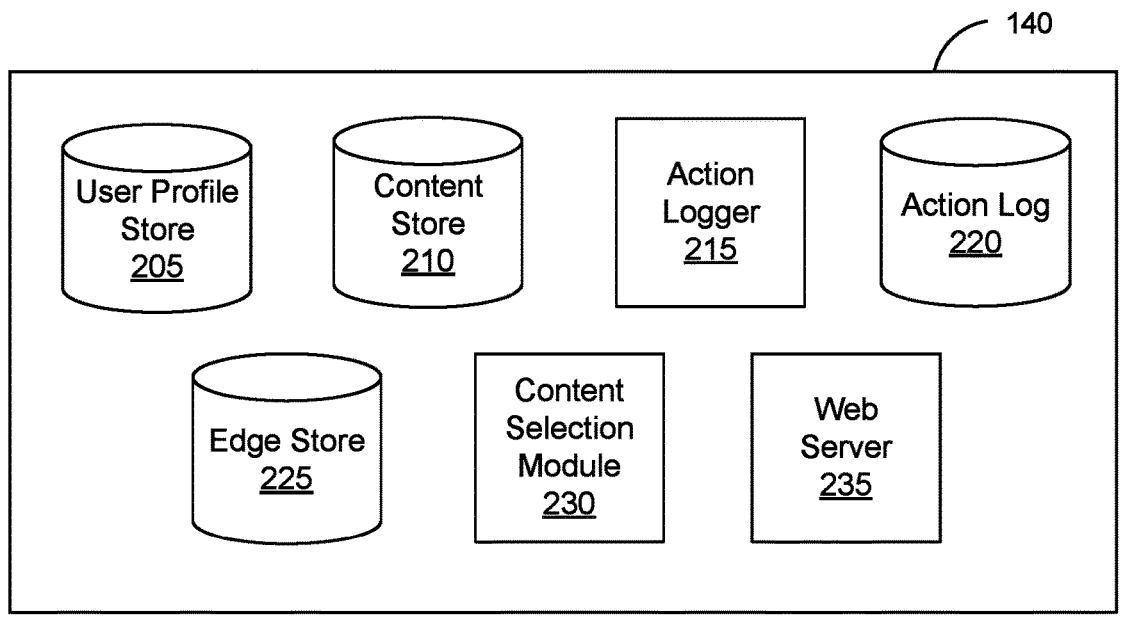
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 110 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed includes content items such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed including a plurality of content items selected for presentation to the user. The content selection module 230 may also determine the order in which selected content items are presented via the feed. For example, the content selection module 230 orders content items in the feed based on likelihoods of the user interacting with various content items.

The content selection module 230 also generates one or more models that identify likelihoods of a user's gaze being directed to locations within video data based on information received by the online system 140 from client devices 110 that presented the video data or that presented video data having at least a threshold amount of characteristics matching characteristics of video data. As further described above in conjunction with FIG. 1, various client devices 110 include gaze tracking systems 117 that determine locations where users' gazes were directed at different times. When various client devices 110 present video data from the online system 140 to viewing users, gaze tracking systems 117 included in the client devices 110 determine locations within the video data where gazes of various viewing users were directed at different times during presentation of the video data. The content selection module 230 receives the information describing locations within the video data where gazes of various viewing users were directed at different times during presentation of the video data from the client devices 110 and generates a model identifying likelihoods of gazes of users being directed to different locations within the video data based on the locations within the video data where gazes of various viewing users were directed at different times during presentation of the video data and characteristics of the various viewing users retrieved from the user profile store 205, the action log 220, and the edge store 225, as well as characteristics of the video data retrieved from the content store 210. The model may determine likelihoods of the gaze of a user being directed to different segments of the video data, with each segment corresponding to a group of adjacent pixels within a frame of the video data. Generation of the model is further described below in conjunction with FIG. 3.

The content selection module 230 enforces one or more privacy settings of the users of the online system 140 in various embodiments. A privacy setting of a user determines how particular information associated with a user can be shared, and may be stored in the user profile of a user in the user profile store 205. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include user profile information like profile photo, phone numbers associated with the user, user's connections video data including the user, actions taken by the user such as adding a connection, changing user profile information and the like. In various embodiments, the online system 140 maintains privacy settings associated with a user having a default setting preventing other entities from accessing or receiving content associated with the user, and allows the user to modify different privacy settings to allow other entities that are specified by the user to access or to retrieve content corresponding to the modified privacy settings.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 230 includes logic to determine if certain information associated with a user can be accessed by other users connected to the user via the online system 140, third-party system 130 and/or other applications and entities. Based on the user's privacy settings, the content selection module 230 determines if another user, a third-party system 130, an application or another entity is allowed to access information associated with the user, including information about actions taken by the user. For example, the content section module 230 uses a user's privacy setting to determine if video data including the user may be presented to another user. This enables a user's privacy setting to specify which other users, or other entities, are allowed to receive data about the user's actions or other data associated with the user.

When the content selection module 230 selects the video data for presentation to a target user via a client device 110, the content selection module 230 applies the model to characteristics of the video data and to characteristics of the target user to identify likelihoods of the gaze of the target user being directed to different segments of the video data. Based on the identified likelihoods, the content selection module 230 determines a target segment of the video data. As further described below in conjunction with FIG. 3, the target segment corresponds to a segment of the video data where the gaze of the target user has at least a threshold likelihood of being directed or to a segment of the video data having at least a threshold position in a ranking of segments based on likelihoods of the gaze of the target user being directed. In various embodiments, the target segment is a segment of the video data to which the target user's gaze is most likely to be directed. The content selection module 230 transmits the video data to a client device 110 associated with the target user for presentation so the target segment has a higher resolution or quality than other segments of the video data. For example, the content selection module 230 transmits the video data to the client device 110 associated with the target user so segments of the video data have resolutions (or qualities) that are directly related (e.g., directly proportional) to likelihoods of the target user's gaze being directed to the segments, as further described below in conjunction with FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
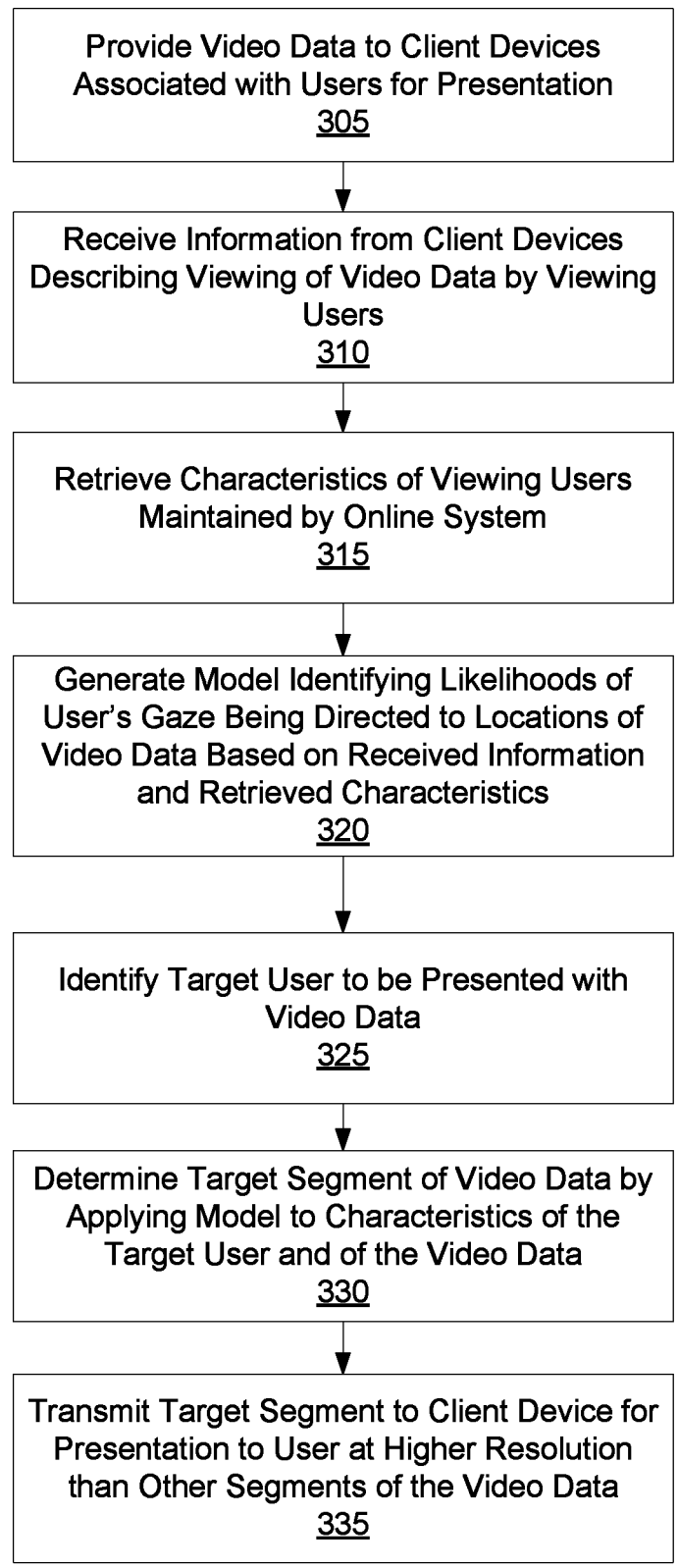
FIG. 3 is a flowchart of a method for selecting a segment of video data for presentation to a target user of an online system 140 based on likelihoods of a gaze of the target user being directed to different locations within the video data, in accordance with an embodiment.

Presenting Segments of Video Data to a User Based on Prediction of the User's Gaze FIG. 3 is a flowchart of a method for selecting a segment of video data for presentation to a target user of an online system 140 based on likelihoods of a gaze of the target user being directed to different locations within the video data. In various embodiments, the steps described in conjunction with FIG. 3 may be performed in different orders. Additionally, in some embodiments, the method may include different and/or additional steps than those shown in FIG. 3.

The online system 140 receives or maintains various video content received from users and presents various video data from the video content to online system users. For example, the online system 140 selects video data for presentation to a user based on characteristics of different video content and characteristics of the user through one or more selection processes, as further described above in conjunction with FIG. 2. This allows the online system 140 to select video data that is most likely to be relevant to the user or with which the user is most likely to interact.

As the online system 140 receives requests for content from various users, the online system 140 provides 305 video data to client devices associated with the various users for presentation. As further described above in conjunction with FIG. 1, each client device 110 includes a display device 115 configured to present content, including the video data, to a user of the client device 110. Various client devices 110 also include a gaze tracking system 117 that captures information identifying locations of the display device 115 where a user's gaze was directed at different times. For example, the display device 115 of a client device 110 is a head mounted display (HMD) including an electronic display element presenting content to a user and also including a gaze tracking system 117 configured to capture information about the user's eyes from which a location of the display device 115 where a gaze of the user is directed at different times during presentation of the video data. In some embodiments, based on the location where the gaze of the user is directed at different times during presentation of the video data, the client device 110 identifies the video data, a location within the video data corresponding to the location of the display device 115 where the gaze of the user was directed, and associates the location within the video data where the gaze of the user was directed with a portion of the video data presented when the gaze of the user was determined. For example, the client device 110 associates the location within the video data where the gaze of the user was directed with a timestamp of the video data presented by the client device 110. This allows the client device 110 to capture information about locations within the video data where the gaze of the user was directed at different times within video data provided 305 by the online system 140 and presented by the client device 110.

The online system 140 subsequently receives 310 information describing viewing of the provided video data from client devices 110 including gaze tracking systems 117 by viewing users who were presented with the video data. In various embodiments, the online system 140 receives 310 information identifying video data presented to a viewing user by a client device 110 and locations within the video data where the gaze of the viewing user was directed that are each associated with a timestamp identifying a portion of the video presented by the display device 115 of the client device 110. Alternatively, the online system 140 receives 310 information identifying video data presented to a viewing user by a client device 110, locations of the display device 115 of the client device 110 where the gaze of the viewing user was directed that are each associated with a timestamp identifying a portion of the video presented by the display device 115 of the client device 110, and information describing the display device 115 of the client device 110. From the locations of the display device 115 where the gaze of the viewing user was directed at different timestamps, the video data, and the information describing the display device 115, the online system 140 determines locations of the video data where the gaze of the viewing user was directed at different timestamps. A location of the video data where the gaze of the viewing user was directed identifies one or more pixels of the video data where the gaze of the viewing user was directed. For example, the online system 140 identifies a location of the video data corresponding to a location of the display device 115 where the gaze of the viewing user was directed at a timestamp to determine a location within the video data presented at the timestamp where the gaze of the user was directed.

The online system 140 may receive 310 other information along with the information describing viewing of the video data from client devices 110 presenting the video data. For example, a client device 110 provides a location of the client device 110 when the video was presented in conjunction with the information describing viewing of the video data by a user. As another example, a client device 110 provides information describing a bandwidth of a connection between the client device 110 and a network 120 or a signal quality between the client device 110 and the network 120.

For viewing users for whom information describing viewing of the video data was received from various client devices 110, the online system 140 retrieves 315 characteristics of the viewing user maintained by the online system 140. The online system 140 retrieves 315 any suitable characteristics of a viewing user from information associated with the viewing user by the online system 140. For example, the online system 140 retrieves 315 demographic information and interests of a viewing user from a user profile maintained by the online system 140 for the viewing user, connections between the viewing user and other users or objects of the online system 140, actions performed by the viewing user, or any other characteristics of the viewing user maintained by the online system 140.

Based on characteristics of various viewing users, characteristics of video data presented to the viewing users, and identified locations within the video data where gazes of viewing users to whom video data was presented were directed during different portions of the video data, the online system 140 generates 320 a model identifying likelihoods of a gaze of a user being directed to locations within the video data during various portions of the video data. The model may also account for other information received from client devices 110 describing viewing of video data by viewing users, such as bandwidths between client devices 110 and one or more networks 120 when presenting the video data to viewing users or signal strengths between client devices 110 and one or more networks 120 when presenting the video data to viewing users. In various embodiments, the online system 140 generates 320 a model for specific video data, such as a specific video file, presented to various viewing users based on characteristics of the viewing users, characteristics of the specific video data, and identified locations within the specific video data where gazes of viewing users to whom the specific video data was presented were directed during different portions of the specific video data. In some embodiments, the online system 140 accounts for presentation of other video data presented to viewing users and having at least a threshold amount of characteristics matching characteristics of the specific video data. For example, the online system 140 retrieves other video data having at least the threshold amount of characteristics matching characteristics of the specific video data, retrieves locations within the specific video data where gazes of viewing users to whom the other identified video data was presented were directed during different portions of the identified other video data and generates 320 the model based on characteristics of viewing users presented with the video data or with the identified other video data, characteristics of video data presented to the viewing users, characteristics of the identified other video data, identified locations within the video data where gazes of viewing users to whom the video data was presented were directed during different portions of the video data, and identified locations within the video data where gazes of viewing users to whom the other video data was presented were directed during different portions of the video data. In some embodiments, if the online system 140 determines specific video data was presented to less than a threshold number or less than a threshold amount of viewing users, the online system 140 generates 320 a model for the specific video data based on characteristics of viewing users presented with the identified other video data, characteristics of the identified other video data, and identified locations within the video data where gazes of viewing users to whom the identified other video data was presented were directed during different portions of the identified other video data.

Alternatively or additionally, the online system 140 generates 320 a model based on characteristics of different video data presented to the viewing users, characteristics of the viewing users, and identified locations within different video data where gazes of viewing users to whom video data was presented were directed during different portions of the video data; hence, the online system 140 may generate 320 a model applicable to various video data to determine likelihoods of gazes of online system users being directed to different locations within video data during presentation of different portions of the video data to the users. In other embodiments, the online system 140 generates 320 a model for different groups of users, with each user in a group having one or more common characteristics. For example, the online system 140 identifies a group of viewing users having one or more common characteristics, and generates 320 a model for the group of viewing users based on characteristics of viewing users of the group presented with video data, characteristics of the video data, and identified locations within the video data where gazes of viewing users of the group were directed during different portions of the video data. As further described above, the online system 140 may account for presentation of different video data to viewing users of the group and locations within different video data where gazes of viewing users of the group were directed during different portions of the different video data when generating 320 the model for the group. Alternatively, the online system 140 generates 320 the model for the group based on presentation of specific video data to users of the group and locations within the specific video data where gazes of users of the group were directed during different portions of the specific video data. The online system 140 stores the model generated 320 for the group of viewing users in association with information identifying the one or more common characteristics of viewing users of the group. Models generated 320 for different groups are stored by the online system 140. In various embodiments, the online system 140 the online system 140 uses one or more machine learning methods to generate 320 the model or models.

Subsequent to generating 320 the model, the online system 140 identifies 325 a target user to be presented with the video data. For example, the online system 140 receives a request for content from a client device 110 associated with the target user and selects the video data for presentation to the target user. The online system 140 retrieves one or more models and applies a retried model to characteristics of the target user and characteristics of the viewing user. Application of the model determines likelihoods of the gaze of the target user being directed to different segments of the video data. Based on the determined likelihoods, the online system determines 330 the target segment of the video data, as further described above. As the video data is presented to the target user via the client device 110 associated with the target user, the gaze tracking system 117 of the client device 110 associated with the target user identifies locations within the video data where the gaze of the target user is directed during different portions of the video data to the online system 140. The online system 140 applies the retrieved model to the characteristics of the user, to the characteristics of the video data, and to the identified location within the video data where the gaze of the target user was directed during a portion of the video data to determine 330 a target segment of a subsequent portion of the video data.

In some embodiments, the online system 140 transmits one or more portions of the video data including one or more segments of the video data and correspond to a time interval of the video data to a client device 110 associated with a target user for presentation. For example, the online system 140 transmits one or more portions of the video data to a client device 110 for presentation to a target user to whom the video data has not previously been presented. Segments of the video data included in the transmitted one or more portions each correspond to one or more locations within the video data. As the client device 110 presents a portion of the video data to the target user via a display device 115, a gaze tracking system 117 of the client device 110 captures information about the target user's eyes from which a location of the display device 115 where a gaze of the target user is directed at different times during presentation of the portion of the video data, as further described above. The client device 110 associated with the target user transmits information where the gaze of the target user is directed at different times during presentation of the portion of the video data to the online system 140, as further described above.

When the online system 140 receives the information from the client device 110 associated with the target user identifying one or more locations within the video data where the gaze of the target user was directed, the online system 140 retrieves one or more models and determines 330 a target segment of the video data based on the retrieved model. The target segment comprises one or more pixels corresponding to locations within the video data. For example, the online system 140 applies a model to characteristics of the target user and characteristics of the video data to determine likelihoods of the gaze of the target user being directed to different locations at times subsequent to a time when the information identifying the one or more locations within the video data where the gaze of the target user was directed during presentation of the one or more portions of the video data. In various embodiments, application of a model to characteristics of the target user and to characteristics of the video data generates a map of the video data associating likelihoods of the gaze of the target user being directed to different segments of the video data, which each correspond to locations within the video data. In various embodiments, the retrieved model accounts for one or more locations within the video data where the gaze of the target user was directed during different portions of the video data when determining likelihoods of the gaze of the target user being directed to different locations within the video data. The online system 140 determines 330 the target segment of the video data based on the likelihoods of the gaze of the target user being directed to different segments of the video data generated from application of the model. In various embodiments, the online system 140 determines 330 the target segment as a segment of the video data as a segment of the video data for which the model generated a maximum likelihood of the gaze of the user being directed.

In embodiments where the online system 140 generated 320 models for various groups of viewing users, the online system 140 selects a group including the target user and applies a model associated with the selected group to characteristics of the target user, characteristics of the video data, and locations within the video data where the gaze of the target user was directed during different portions of the video data. For example, the online system 140 retrieves characteristics of the target user and selects a group of viewing users having one or more common characteristics matching characteristics of the target user. The online system 140 retrieves a model associated with the selected group and applies the model associated with the selected group to characteristics of the target user, characteristics of the video data, and locations within the video data where the gaze of the target user was directed during different portions of the video data.

Alternatively, when the online system selects the video data for presentation to the target user, the online system retrieves one or more models and applies a retried model to characteristics of the target user and characteristics of the viewing user. Application of the model determines likelihoods of the gaze of the target user being directed to different segments of the video data. Based on the determined likelihoods, the online system determines 330 the target segment of the video data, as further described above. As the video data is presented to the target user via the client device 110 associated with the target user, the gaze tracking system 117 of the client device 110 associated with the target user identifies locations within the video data where the gaze of the target user is directed during different portions of the video data to the online system 140. The online system 140 applies the retrieved model to the characteristics of the user, to the characteristics of the video data, and to the identified location within the video data where the gaze of the target user was directed during a portion of the video data to determine 330 a target segment of a subsequent portion of the video data.

The online system 140 transmits 335 the target segment of the video data to the client device 110 associated with the target user for presentation at a higher quality than other segments of the video data. For example, the online system 140 transmits 335 transmits additional segments of the video data to the client device 110 associated with the target user at a lower resolution than a resolution of the target segment of the video data. In some embodiments, the online system 140 transmits segments of the video data to the client device 110 associated with the target user at resolutions that are directly related to likelihoods of the gaze of the target user being directed to the segments, with the target segment transmitted 335 to the client device 110 associated with the target user at a higher resolution than other segments of the video data. For example, the online system 140 transmits segments of the video data to the client device 110 associated with the target user with resolutions that are directly proportional to likelihoods of the gaze of the target user being directed to different segments of the video data determined by the model. In other embodiments, the online system 140 transmits 335 the target segment to the client device 110 associated with the target user at a higher frame rate than frame rates with which other segments of the video data are transmitted to the client device 110 associated with the target user.

In some embodiments, the online system 140 selects content for presentation to the target user based on characteristics of the target user and modifies the target segment of the video data to include the selected content. The modified target segment is transmitted to the client device 110 associated with the target user, so presentation of the modified video data by the client device 110 associated with the target user presents the selected content to the target user via the target segment of the video data. For example, the online system 140 selects a content item for presentation to the target user via one or more selection processes, as further described above in conjunction with FIG. 2, and modifies the target segment of the video data by overlaying a portion of the selected content item (e.g., an image, text data) on the target segment of the video data on the target segment. This allows the online system 140 to present the selected content in a location within the video data where the target user's gaze is most likely to be directed, increasing a likelihood of the target user viewing the selected content when viewing the video data. When selecting content to overlay on the target segment of the video data, the online system 140 accounts for characteristics of the video data in various embodiments. For example, the online system 140 identifies content items associated with at least a threshold amount of topics or keywords matching topics or keywords of the video data and selects a content item from the identified content item. Additionally, the online system 140 may prevent modification of the video data if the target segment includes certain content or has certain characteristics.

In other embodiments, based on likelihoods of the gaze of the target user being directed to different segments of the video data based on application of the model, the online system 140 identifies a set of segments of the video data and modifies one or more segments of the set to include content selected for the target user. For example, the online system 140 ranks segments of the video data based on the likelihoods of the gaze of the target user being directed to locations within the video data corresponding to each segment and selects segments having at least a threshold position within the ranking or selects segments within a range of positions within the ranking as the set. Alternatively, the online system 140 selects segments having at least a threshold likelihood of the gaze of the target user being directed or having likelihoods of the gaze of the target user being directed within a range of likelihoods as the set. For one or more segments of the set, the online system 140 selects a content item, as further described above in conjunction with FIG. 2, and modifies the one or more segments of the set to include the content selected for the target user.

Additionally, the online system 140 may apply one or more models to various users and various video data associated with a publishing user to determine likelihoods of gazes of various users being directed to segments in various video data associated with the publishing user. The online system 140 may aggregate the determined likelihoods and provide the aggregated likelihoods to the publishing user. For example, the online system 140 averages likelihoods of users' gazes being directed to different locations within each of a set of video data associated with the publishing user to determine average likelihoods of users' gazes being directed to different segments of each video data of the set. When aggregating likelihoods of users' gazes being directed to different segments of presented video data, the online system 140 may aggregate likelihoods determined for users having one or more specific characteristics. The online system 140 may provide the averaged likelihoods to the publishing user, allowing the publishing user to position content within subsequent video data that accounts for locations within previously presented video data associated with the publishing user where users' gazes were directed. For example, the publishing user may leverage information about where users' gazes were directed in previously presented video data to position certain content in additional video data to maximize likelihoods of users' gazes being directed to the certain content within the additional video data. Similarly, the online system 140 may aggregate locations within presented video data where gazes of viewing users were directed that the online system 140 received from gaze tracking systems 117 of client devices 110 that presented video data to the viewing users. The online system 140 may receive compensation from the publishing user for the averaged likelihoods in some embodiments.

Figure 4:
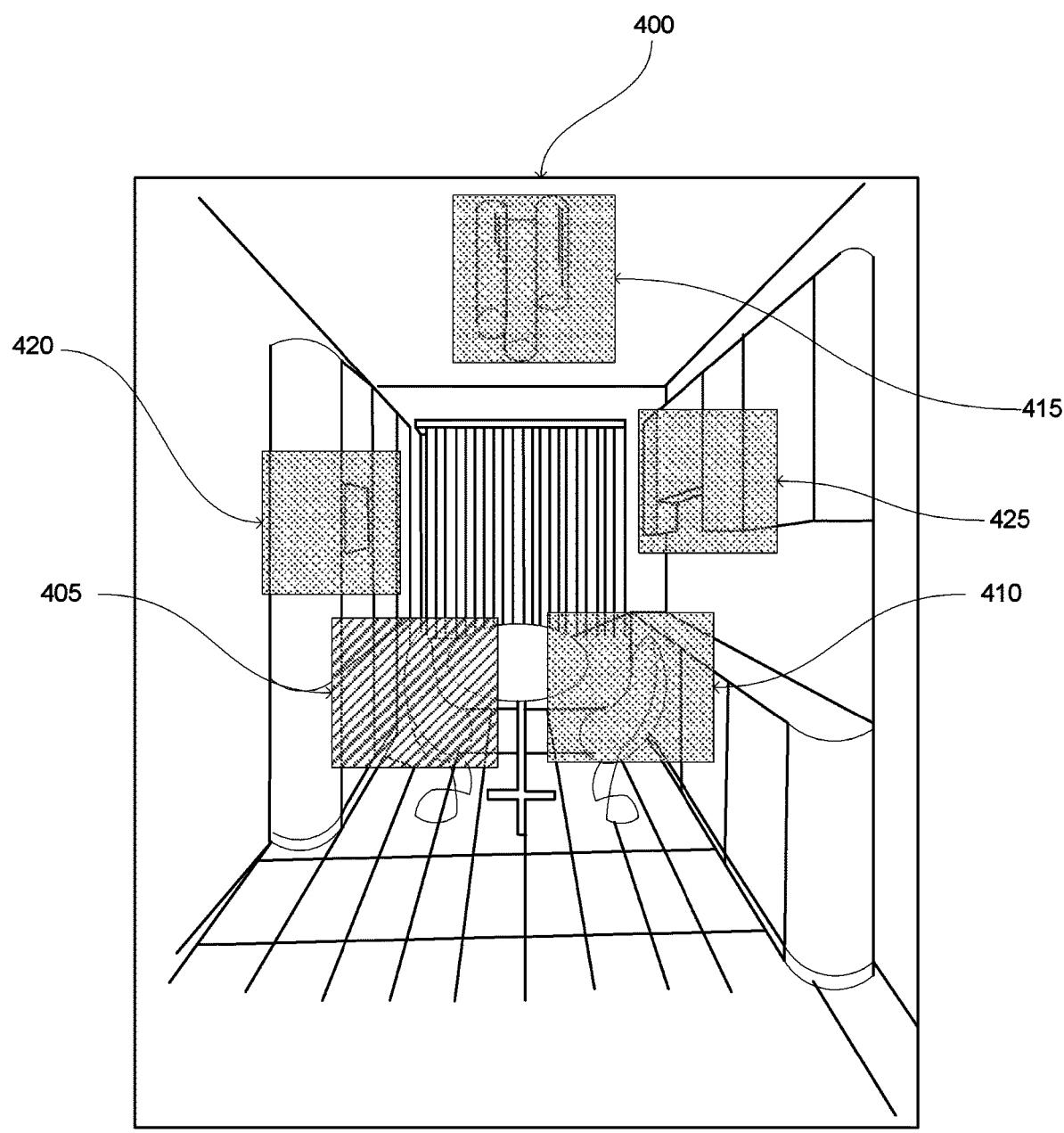
FIG. 4 is an example identification of segments of a frame of video data based on likelihoods of a gaze of a target user being directed to different locations within the frame of video data, in accordance with an embodiment.

FIG. 4 shows an example identification of a target segment of video data based on likelihoods of a target user's gaze being directed to different locations within video data. For purposes of illustration, FIG. 4 shows a frame 400 corresponding to a portion of video data presented to various viewing users via client devices 110. The frame 400 corresponds to content of the video data presented at a specific time of the video data. As further described above in conjunction with FIG. 3, the online system 140 receives information from client devices 110 that presented the video data to various viewing users identifying locations within the video data where gazes of viewing users were directed when the video data was presented to the viewing users and timestamps identifying a portion of the video presented when gazes of viewing users were directed to corresponding locations within the video data. For example, a client device 110 that presented the video data to a viewing user transmits information describing locations within the video data where the gaze of the viewing user was directed at different times during presentation (e.g., during different frames of the video data, during different times of the video data). As further described above in conjunction with FIG. 3, based on characteristics of viewing users to whom the video data was presented, locations within the video data where the user's gaze was directed at different portions of the video data, and characteristics of the video data, the online system 140 generates a model identifying likelihoods of a gaze of an online system user being directed to locations within the video data during portions of the video data. For example, the model identifies likelihoods of a gaze of a user being directed to locations within a frame of the video data based on characteristics of the user, characteristics of the video data, and a location within one or more previous frames of the video data where the gaze of the user was directed.

In the example of FIG. 4, the online system 140 provided the video data to a client device 110 associated with a target user and received information from the client device 110 associated with the target user identifying locations within the video data where the gaze of the target user was directed in one or more frames of the video data previously presented to the target user. The online system 140 applies the model to the identified locations within the video data where the target user's gaze was previously directed, characteristics of the video data, and characteristics of the target user to identify likelihoods of the target user's gaze being directed to different locations within the frame 400 of the video data when it is presented to the target user. For example, the model identifies likelihoods of the target user's gaze being directed to different segments of the frame 400 of the video data, where each segment corresponds to one or more pixels of the frame 400 of the video data. As a specific example, the model identifies likelihoods of the gaze of the target user being directed to different rectangular blocks of adjacent pixels of the frame 400 of the video data.

In the example of FIG. 4, segments of the frame 400 of the video data to which the gaze of the target user has at least a threshold likelihood of being directed are identified for purposes of illustration. For example, the online system 140 identified the gaze of the target user as having at least the threshold likelihood of being directed to segments 405, 410, 415, 420, 425 of the frame 400 of video data from application of the model. In some embodiments, the likelihood of the target user's gaze being directed to each of segments 405, 410, 415, 420, 425 has at least the threshold likelihood. Alternatively, the online system 140 ranks segments of the frame of the video data based on likelihoods of the target user's gaze being directed to each segment of the frame 400 of the video data, and segments 405, 410, 415, 420, 425 have at least a threshold position in the ranking.

From the identified likelihoods of the gaze of the target user being directed to different segments of the frame 400 of the video data, the online system 140 determines a target segment of the frame 400 of the video data. For example, the online system 140 determines the target segment of the frame 400 of the video data as a segment of the frame 400 of the video data for which the target user has a maximum likelihood of being detected. As another example, the online system 140 determines the target segment of the frame 400 of the video data as a segment of the frame 400 for which the likelihood of the user's gaze being directed has a highest position in a ranking. In the example of FIG. 4, the online system 140 determines that segment 405 of the frame 400 of the video data is the target segment based on the determine likelihoods and subsequently transmits segment 405 of the frame 400 of the video data to a client device 110 at a higher resolution relative to other segments of the frame 400 of the video data. For example, the online system 140 transmits the frame of the video data 400 each segment of the video data 400 has s resolution directly related to a likelihood of the gaze of the target user being directed to a segment of the video data 400.

In some embodiment, the online system 140 may modify the frame 400 of the video data so alternative content is presented in certain segments of the video data. For example, the online system 140 overlays content form a content item on certain segments of the frame 400 of the video data, such as segments to which the target user's gaze has at least a threshold likelihood of being directed. Referring to FIG. 4, the online system 140 may modify one or more of segments 405, 410, 415, 420, 425 to present content from one or more content items and transmit the modified frame of the video data for presentation. This allows the online system 140 to present additional content to the target user via the video data so the target user has an increased likelihood of noticing the additional content during presentation of the video data.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    providing video data from an online system to one or more client devices for presentation to one or more viewing users via display devices;
    receiving information describing viewing of the video data from at least a set of the one or more client devices, information describing viewing of the video data from a client device identifying locations within the video data where a gaze of a viewing user of the client device was directed during different portions of the video data;
    retrieving characteristics of the viewing users for whom information was received, wherein the characteristics of the viewing users describe a level of interest of the viewing user for each of a plurality of objects stored by the online system;
    generating a model identifying likelihoods of a gaze of a user of the online system being directed to locations within the video data during portions of the video data based on the video data and a level of interest of the user for each of the plurality of objects;
    identifying a target user of the online system to be presented with the video data, wherein a user profile for the target user stored at the online system comprises characteristics of the target user describing a level of interest of the user for each of a plurality of objects;

determining a target segment of the video data based on likelihoods of the gaze of the target user being directed to different locations within the video data at times of the video data by applying the model to characteristics of the target user and the video data; and transmitting the target segment of the video data to a client device associated with the target user for presentation at a higher quality than other segments of the video data.

2. The method of claim 1, wherein transmitting the target segment of the video data to the client device associated with the target user of the online system for presentation comprises:

receiving a request for the video data from the client device associated with the target user;

receiving a location of a display device of the client device associated with the target user where the gaze of the target user is directed from the client device associated with the target user;

selecting a segment of the video data corresponding to the received location of the display device of the client device associated with the target user; and transmitting the selected segment of the video data to the client device associated with the target user.

3. The method of claim 2, wherein transmitting the selected segment of the video data to the client device associated with the target user comprises:

transmitting additional segments of the video data to the client device associated with the target user at a lower resolution than a resolution of the selected segment of the video data.

4. The method of claim 3, wherein transmitting additional segments of the video data to the client device associated with the target user at the lower resolution than the resolution of the selected segment of the video data comprises:

transmitting an additional segment of the video data to the client device associated with the target user at a specific resolution based on a likelihood of the gaze of the target user being directed to a location within video data corresponding to the additional segment.

5. The method of claim 4, wherein the specific resolution of the additional segment is directly related to the likelihood of the gaze of the target user being directed to a location within video data corresponding to the additional segment.

6. The method of claim 1, wherein generating the model identifying likelihoods of the gaze of the online system being directed to locations within the video data during portions of the video data based on the video data and a level of interest of the user for each of the plurality of objects comprises:

identifying viewing users having at least a threshold amount of common characteristics; and generating the model based on characteristics of the identified viewing users, characteristics of the video data presented to the identified viewing users, and identified locations within the video data where gazes of the identified viewing users were directed during different portions of the video data.

7. The method of claim 1, wherein generating the model identifying likelihoods of the gaze of the online system being directed to locations within the video data during portions of the video data based on the video data and a level of interest of the user for each of the plurality of objects comprises:

identifying groups of viewing users, each group including viewing users having one or more common characteristics;

generating a group model for each group, the group model for a group based on characteristics of the viewing users of the group, characteristics of the video data presented to the viewing users of the group, and identified locations within the video data where gazes of the viewing users of the group were directed during different portions of the video data.

8. The method of claim 7, further comprising:

selecting a group including the target user based on characteristics of the target user;

retrieving a group model for the selected group;

applying the group model for the selected group to characteristics of the target user and characteristics of the video data; and determining the target segment of the video data based on likelihoods determined from application of the group model for the selected group to characteristics of the target user and characteristics of the video data.

9. The method of claim 1, wherein generating the model identifying likelihoods of the gaze of the online system being directed to locations within the video data during portions of the video data based on the video data and a level of interest of the user for each of the plurality of objects comprises:

identifying viewing users having at least a threshold amount of common characteristics; and generating the model based on characteristics of the identified viewing users, characteristics of the video data presented to the identified viewing users, and identified locations within the video data where gazes of the identified viewing users were directed during different portions of the video data.

10. The method of claim 1, wherein determining the target segment of the video data based on likelihoods of the gaze of the target user being directed to different locations within the video data at times of the video data comprises:

transmitting one or more portions of the video data to the client device associated with the target user;

receiving information from the client device associated with the target user identifying one or more locations within the video data where the gaze of the target user was directed during the one or more portions of the video data;

determining likelihoods of the gaze of the target user being directed to different locations within the video data during additional portions of the video data subsequent to the one or more portions of the video data by applying the model to characteristics of the target user, characteristics of the video data, and locations within the video data where the gaze of the target user was directed during the one or more portions of the video data; and determining a target segment of an additional portion of the video data subsequent to the one or more portions of the video data based on the likelihoods of the gaze of the target user being directed to different locations within the video data during additional portions of the video data subsequent to the one or more portions of the video data.

11. The method of claim 1, wherein determining the target segment of the video data based on likelihoods of the gaze of the target user being directed to different locations within the video data at subsequent times by applying the model to characteristics of the target user and the video data comprises:

selecting content for presentation to the target user based on characteristics of the target user; and modifying the target segment of the video data to include the selected content.

12. The method of claim 11, further comprising:
transmitting the modified target segment of the video data to the client device associated with the target user.

13. A computer program product comprising a non-transitory computer readable storage medium having instructions encoded thereon that, when executed by a processor, cause the processor to:
access a machine learned model that predicts a gaze of a user viewing video data based on characteristics of the user comprising a level of interest of the user for each of a plurality of objects, wherein the model is generated using a plurality of locations in video data where gazes of a plurality of users were directed during different portions of the video data and characteristics of each user of the plurality;
identify a target user of an online system to be presented with the video data, wherein a user profile for the target user stored at the online system comprises characteristics of the target user describing a level of interest of the user for each of a plurality of objects;
receiving, at the online system, video data from a content provider;
determine a target segment of the video data based on likelihoods of a gaze of the target user being directed to different locations within the video data at times of the video data by applying the model to characteristics of the target user and the video data; and
transmit the target segment of the video data to a client device associated with the target user for presentation at a higher quality than other segments of the video data.

14. The computer program product of claim 13, wherein instructions to transmit the target segment of the video data to the client device associated with the target user of the online system for presentation further cause the processor to:
receive a request for the video data from the client device associated with the target user;
receive a location of a display device of the client device associated with the target user where the gaze of the target user is directed from the client device associated with the target user;
select a segment of the video data corresponding to the received location of the display device of the client device associated with the target user; and
transmit the selected segment of the video data to the client device associated with the target user.

15. The computer program product of claim 14, wherein instructions to transmit the selected segment of the video data to the client device associated with the target user further cause the processor to:
transmit additional segments of the video data to the client device associated with the target user at a lower resolution than a resolution of the selected segment of the video data.

16. The computer program product of claim 15, wherein instructions to transmit additional segments of the video data to the client device associated with the target user at the lower resolution than the resolution of the selected segment of the video data further cause the processor to:
transmit an additional segment of the video data to the client device associated with the target user at a specific resolution based on a likelihood of the gaze of the target user being directed to a location within video data corresponding to the additional segment.

17. The computer program product of claim 16, wherein the specific resolution of the additional segment is directly related to the likelihood of the gaze of the target user being directed to a location within video data corresponding to the additional segment.

18. The computer program product of claim 13, wherein instructions to identify a target user of the online system to be presented with the video data further cause the processor to:
identify viewing users having at least a threshold amount of common characteristics; and
generate the model based on characteristics of the identified viewing users, the video data presented to the identified viewing users, and identified locations within the video data where gazes of the identified viewing users were directed during different portions of the video data.

19. The computer program product of claim 13, wherein instructions to determine the target segment of the video data based on likelihoods of the gaze of the target user being directed to different locations within the video data at times of the video data further cause the processor to:
transmit one or more portions of the video data to the client device associated with the target user;
receive information from the client device associated with the target user identifying one or more locations within the video data where the gaze of the target user was directed during the one or more portions of the video data;
determine likelihoods of the gaze of the target user being directed to different locations within the video data during additional portions of the video data subsequent to the one or more portions of the video data by applying the model to characteristics of the target user, characteristics of the video data, and locations within the video data where the gaze of the target user was directed during the one or more portions of the video data; and
determine a target segment of an additional portion of the video data subsequent to the one or more portions of the video data based on the likelihoods of the gaze of the target user being directed to different locations within the video data during additional portions of the video data subsequent to the one or more portions of the video data.

20. The computer program product of claim 13, wherein instructions to determine the target segment of the video data based on likelihoods of the gaze of the target user being directed to different locations within the video data at subsequent times by applying the model to characteristics of the target user and characteristics of the video data further cause the processor to:
select content for presentation to the target user based on characteristics of the target user; and
modify the target segment of the video data to include the selected content.

* * * * *